United States Patent [19]
Blakely et al.

[11] Patent Number: 5,118,760
[45] Date of Patent: Jun. 2, 1992

[54] IMPACT RESISTANT POLYMER BLENDS

[75] Inventors: Dale M. Blakely; Robert W. Seymour, both of Kingsport, Tenn.

[73] Assignee: Eastman Kodak Company, Rochester, N.Y.

[21] Appl. No.: 633,843

[22] Filed: Dec. 26, 1990

[51] Int. Cl.$^5$ .................. C08L 67/02; C08L 23/12
[52] U.S. Cl. ................................ 525/173; 525/64; 525/92; 525/177
[58] Field of Search ................ 525/173, 177, 92, 64

[56] References Cited

U.S. PATENT DOCUMENTS

| | | | |
|---|---|---|---|
| 3,223,752 | 12/1965 | Tate et al. | 260/873 |
| 3,361,858 | 1/1968 | Wichterle | 264/1 |
| 3,431,322 | 3/1969 | Caldwell et al. | 260/873 |
| 3,487,453 | 12/1969 | Sheehan | 260/897 |
| 3,504,080 | 3/1970 | Siggel et al. | 264/235 |
| 3,719,729 | 3/1973 | Le Paranthoen et al. | 260/87.3 |
| 3,937,757 | 2/1976 | Seydl et al. | 260/873 |
| 3,941,021 | 3/1976 | Meinholdt | 83/604 |
| 4,073,827 | 2/1978 | Okasaka et al. | 260/835 |
| 4,349,469 | 9/1982 | Davis et al. | 524/765 |
| 4,368,295 | 1/1983 | Newton et al. | 525/166 |
| 4,510,743 | 4/1985 | de Kroon | 57/260 |
| 4,616,064 | 10/1986 | Zukosky et al. | 525/92 |

OTHER PUBLICATIONS

"Man-Made Fibers: Science and Technology," vol. III, edited by Mark, Atlas, and Cernia, published by Interscience Publishers describes preparation of 1,4-cyclohexanedicarboxylic acid and 1,4-cyclohexanedimethanol at p. 85.

*Primary Examiner*—Patricia Short
*Attorney, Agent, or Firm*—John F. Stevens; William P. Heath, Jr.

[57] ABSTRACT

Disclosed is a polymer blend of a copolyesterether and an isotactic homopolymer of propylene, molded articles of which have improved impact strength.

6 Claims, No Drawings

IMPACT RESISTANT POLYMER BLENDS

TECHNICAL FIELD

This invention relates to blends of isotactic homopolymers of propylene with certain copolyesterethers which have improved impact strengths. These blends are useful as molding compositions.

BACKGROUND OF THE INVENTION

Certain polyesterethers are used in medical applications such as intravenous solution bags. Polypropylene is a widely used thermoplastic polyolefin. Blends of polyesters and polyolefins are generally very incompatible and do not possess properties suitable for injection molding applications. Blends of polyesters and polyolefins with desirable physical properties would enable the development of materials with wide ranges of cost, processibility, water absorption rates, chemical resistance, and other properties. Such blends would be useful in a wide range of injection molding applications. The blends described herein were unexpectedly found to possess excellent combinations of toughness and strength.

U.S. Pat. No. 3,937,757 discloses that blends of polybutylene terephthalate and polyolefins have improved electrical tracking resistance, but there is no mention of the physical properties of injection molded parts. U.S. Pat. Nos. 3,504,080 and 3,361,858 claim that the addition of minor amounts of polyolefins improve the dimensional stability of polyethylene terephthalate, but such blends do not possess the excellent physical properties of the subject blends. Other patents discuss films (U.S. Pat. Nos. 3,941,021; 3,719,729) or fibers (U.S. Pat. Nos. 4,510,743; 3,431,322; 3,487,453) made of polyester/polyolefin blends but give no indication that these blends possess useful molding properties. Other patents discuss polyester/polyolefin blends in which either the polyolefin (U.S. Pat. No. 4,368,295) or the polyester (U.S. Pat. No. 3,223,752) is modified in some way or a third component is added to the blend (U.S. Pat. Nos. 4,616,064; 4,073,827) in order to achieve useful properties.

DESCRIPTION OF THE INVENTION

According to the present invention, there are provided polymer blends which have improved impact strengths comprising I. about 20-95 wt % of a copolyesterether having an I.V. of about 0.8-1.5 dl/g and containing repeat units from
  A. a dicarboxylic acid component consisting essentially of 1,4-cyclohexanedicarboxylic acid having a trans isomer content of at least 70%, preferably at least 80%,
  B. a glycol component consisting essentially of
    1. about 75-96 mol % of 1,4-cyclohexanedimethanol, preferably having a trans isomer content of at least 60%, and
    2. about 25-4 mol % (about 15 to 50 wt %, based on the weight of the polyesterether), of poly(tetramethylene ether) glycol (PTMG) having a molecular weight of about 500 to 1100, and
  C. from 0 to about 1.5 mol %, based on the mole % of the acid or glycol component, of a branching agent having at least three functional groups consisting of COOH and/or OH and from 3 to 60 carbon atoms, and II. about 80-5 wt % of an isotactic homopolymer of propylene having a melt index of about 0.5 to about 100.

The dicarboxylic acid component of the polyesterether of this invention consists essentially of 1,4-cyclohexanedicarboxylic acid having a trans isomer content of at least 70 percent, preferably at least 80 percent, and most preferably, at least 85 percent trans isomer content.

1,4-Cyclohexanedicarboxylic acid and 1,4-cyclohexanedimethanol are well known in the art and commercially available. "Man-Made Fibers: Science and Technology," Vol. III, edited by Mark, Atlas, and Cernia, published by Interscience Publishers describes preparation of 1,4-cyclohexanedicarboxylic acid and 1,4-cyclohexanedimethanol at page 85.

The poly(oxytetramethylene) glycol component of the polyesterether is commercially available, and is prepared by well known techniques. The poly(oxytetramethylene) glycol has a molecular weight of between about 500 and about 1100, preferably about 1000 (weight average).

The polyesterether further may comprise up to about 1.5 mole percent, based on the acid or glycol component, of a polybasic acid or polyhydric alcohol branching agent having at least three COOH or OH functional groups and from 3 to 60 carbon atoms. Esters of many such acids or polyols may also be used. Suitable branching agents include trimellitic acid or anhydride, trimesic acid, trimethylol ethane, trimethylol propane, and trimer acid.

It should be understood that the total acid reactants should be 100 percent, and the total glycol reactants should be 100 mole percent. Although the acid reactant is said to "consist essentially of" 1,4-cyclohexanedicarboxylic acid, if the branching agent is a polybasic acid or anhydride, it will be calculated as part of the 100 mol percent acid. Likewise, the glycol reactant is said to "consist essentially of" 1,4-cyclohexanedimethanol and poly(oxytetramethylene) glycol, if the branching agent is a polyol, it will be calculated as part of the 100 mol percent glycol.

The polyesterethers preferably include a phenolic antioxidant. It is preferred that the phenolic antioxidant be hindered and relatively nonvolatile. Tetrakis[methylene(3,5-di-tert-butyl-4-hydroxyhydrocinnamate)methane] which is commercially available from Ciba-Geigy Chemical Company as Irganox 1010 antioxidant, is preferred. Preferably, the antioxidant is used in an amount of from about 0.1 to about 1.0, based on the weight of copolyesterether.

The trans and cis isomer contents of the final copolyesterether are controlled in order to give polymers that setup or crystallize rapidly. Cis and trans isomer contents are measured by conventional methods well known to those skilled in the art. See, for example, U.S. Pat. No. 4,349,469.

The polyesterether used in this invention may be prepared by conventional techniques. See, for example, U.S. Pat. No. 4,349,469. It should be understood that the blend may contain stabilizers, colorants, processing aids, reinforcing materials such as glass fibers, flame retardants, compatibilizers, etc.

The polyolefin is a primarily isotactic homopolymer of propylene prepared by coordination polymerization. It may contain minor amounts of other alpha-olefin comonomers as long as the crystallinity of the polypropylene is maintained. It may also be modified by grafting with minor amounts of functional monomers such as maleic anhydride, acrylic acid and the like. The polyolefin should have a melt index of from about 0.5 to about 100, preferably from about 5 to about 40, when measured at 230° C. using a 0.0825" die and a 2160 gram weight.

The blends can be melt blended and injection molded on conventional processing equipment. The resulting parts have unexpectedly good low-temperature impact strengths and good tensile strength, ductility, flexural properties, and heat distortion temperatures. For the blends described here, all ratios of the components have higher 0° C. notched Izod impact values than do either of the neat components. These blends are useful as injection molded articles with good toughness and ductility.

The following examples are submitted for a better understanding of the invention.

EXAMPLE 1

Shell Unipol 5C14 polymer is an isotactic polypropylene homopolymer with a melt index of 8, a density of about 0.90 g/cc, and a melting point by DSC of 169° C. It was blended with a copolyesterether with an inherent viscosity of about 1.05. The copolyesterether is produced from cyclohexane dicarboxylic acid and cyclohexane dimethanol with about 10 mole percent poly(tetramethylene ether) glycol and 0.5 mole percent trimellitic anhydride. Blends containing 25, 50, and 75 percent polyesterether were compounded on a 28 mm twin-screw extruder at 230° C. and molded on a Boy 22 injection molding machine at 230° C. with a 23° C. mold. The properties of the blends are shown in Table 1. The 0° C. unnotched Izod impact strengths of all of these blends are higher than the impact strengths of the neat components. These remarkable impact strengths are displayed over a broad range of useful tensile and flexural properties.

EXAMPLE 2

Another copolyesterether having the same chemical composition as in Example 1 but an inherent viscosity of 1.16, was also blended with Unipol 5C14 polymer. Blends containing 10, 25, 50, 75, and 90 percent copolyesterether were compounded on a 1¼" single screw extruder at 230° C. and molded on a Toyo 90 injection molding machine at 230° C. with a 23° C. mold. The properties of the blends are shown in Table 2. The 0° C. unnotched Izod impact strengths of all of these blends containing at least 25% copolyesterether are higher than the impact strengths of the neat components.

EXAMPLE 3

Blends containing 25, 50, and 75% of the copolyesterether described in Example 2 were blended with Tenite 4250 polypropylene, which is an isotactic polypropylene homopolymer with a melt index of 18, a density of about 0.90 g/cc, and a melting point of 167° C. The blends were processed as described in Example 2. The physical properties of these blends are shown in Table 3. As in Example 1, the blends possess higher 0° C. unnotched Izod impact strengths than either neat component.

EXAMPLE 4

Blends containing 25, 50, and 75% polyethylene terephthalate, which has an inherent viscosity of 0.70, were blended with Unipol 5C14 polymer and processed as in Examples 2 and 3 except that the processing temperatures were set at 265° C. The properties of these blends are shown in Table 4. As would be expected for blends of polyesters and polyolefins, the impact strengths of these blends are generally lower than for either neat component. The impact strengths of the polyethylene terephthalate/polypropylene blends show a negative deviation from linearity while the polyesterether/polypropylene blends show a strong and unexpected positive deviation from linearity.

TABLE 1

Physical Properties of Unipol 5C14 Polypropylene/Copolyesterether Blends

| | Unipol 5C14 Polymer | 75% Polypropylene 25% Copolyesterether | 50% Polypropylene 50% Copolyesterether | 25% Polypropylene 75% Copolyesterether | Copolyesterether 9965 |
|---|---|---|---|---|---|
| Tensile Strength, | | | | | |
| at Yield, psi | 5560 | 4980 | 4050 | 3240 | 2350 |
| at Break, psi | 7590 | 4950 | 5100 | 4700 | 4460 |
| Tensile Elongation | | | | | |
| at Yield, % | 8 | 9 | 12 | 18 | 18 |
| at Break, % | 447 | 334 | 311 | 239 | 198 |
| Flexural | | | | | |
| Strength, psi | 5160 | 4720 | 3560 | 2240 | 1120 |
| Modulus, $10^5$ psi | 1.83 | 1.66 | 1.17 | .58 | .20 |
| Notched Izod | | | | | |
| 23° C., ft-lb/in. | .42 | .36 | 1.84 | 13.65 | 10.05 |
| 0° C., ft-lb/in. | .33 | .32 | 1.02 | 9.96 | 12.10 |
| −40° C., ft-lb/in. | .25 | .25 | .72 | 1.31 | .54 |
| Unnotched Izod | | | | | |
| 23° C., ft-lb/in. | 25.11 | 32.80 | 26.21 | 17.74 | 10.39 |
| 0° C., ft-lb/in. | 13.95 | 23.96 | 39.93 | 23.53 | 13.67 |
| −40° C., ft-lb/in. | 4.58 | 5.06 | 13.83 | 42.18 | 32.35 |

TABLE 2

Physical Properties of Unipol 5C14 Polypropylene/Copolyesterether Blends

|  | Unipol 5C14 Polymer | 90% Polypropylene 10% Copolyesterether | 75% Polypropylene 25% Copolyesterether | 50% Polypropylene 50% Copolyesterether | 25% Polypropylene 75% Copolyesterether | 10% Polypropylene 90% Copolyesterether | Copolyesterether 9966 |
|---|---|---|---|---|---|---|---|
| Tensile Strength, | | | | | | | |
| at Yield, psi | 5000 | 4760 | 4270 | 3390 | 2560 | 2030 | 1620 |
| at Break, psi | 2080 | 2350 | 2460 | 2730 | 3420 | 2680 | 2940 |
| Tensile Elongation | | | | | | | |
| at Yield, % | 9 | 9 | 9 | 13 | 22 | 26 | 20 |
| at Break, % | 66 | 47 | 65 | 119 | 412 | 324 | 279 |
| Flexural | | | | | | | |
| Strength, psi | 5550 | 5680 | 5090 | 3920 | 2500 | 1620 | 1150 |
| Modulus, $10^5$ psi | 1.86 | 1.88 | 1.66 | 1.20 | .72 | .44 | .31 |
| Notched Izod | | | | | | | |
| 23° C., ft-lb/in. | .32 | .27 | .34 | .92 | 12.39 | 10.80 | 9.36 |
| 0° C., ft-lb/in. | .29 | .19 | .28 | .50 | 6.19 | 14.77 | 12.19 |
| −40° C., ft-lb/in. | .27 | .26 | .21 | .33 | 1.57 | 2.18 | 19.14 |
| Unnotched Izod | | | | | | | |
| 23° C., ft-lb/in. | 18.60 | 14.13 | 20.36 | 18.69 | 20.37 | 12.02 | 9.17 |
| 0° C., ft-lb/in. | 12.63 | 9.71 | 14.98 | 23.96 | 23.60 | 15.12 | 9.66 |
| −40° C., ft-lb/in. | 4.94 | 5.15 | 4.19 | 10.96 | 30.46 | 22.73 | 17.20 |

TABLE 3

Physical Properties of Tenite 4250 Polypropylene/Copolyesterether Blends

|  | Tenite 4250 | 75% Polypropylene 25% Copolyesterether | 50% Polypropylene 50% Copolyesterether | 25% Polypropylene 75% Copolyesterether | Copolyesterether 9966 |
|---|---|---|---|---|---|
| Tensile Strength, | | | | | |
| at Yield, psi | 4450 | 3860 | 3130 | 2390 | 1620 |
| at Break, psi | 2760 | 360 | 2520 | 3050 | 2940 |
| Tensile Elongation | | | | | |
| at Yield, % | 11 | 11 | 14 | 22 | 20 |
| at Break, % | 285 | 144 | 124 | 360 | 2790 |
| Flexural | | | | | |
| Strength, psi | 4700 | 4190 | 3340 | 2250 | 1150 |
| Modulus, $10^5$ psi | 1.45 | 1.27 | .95 | .60 | .31 |
| Notched Izod | | | | | |
| 23° C., ft-lb/in. | .33 | .31 | .52 | 4.73 | 9.36 |
| 0° C., ft-lb/in. | .22 | .36 | .35 | 2.65 | 12.19 |
| −40° C., ft-lb/in. | .23 | .24 | .33 | 1.46 | 19.14 |
| Unnotched Izod | | | | | |
| 23° C., ft-lb/in. | 24.54 | 26.88 | 19.15 | 15.21 | 9.17 |
| 0° C., ft-lb/in. | 12.10 | 21.27 | 22.56 | 19.53 | 9.66 |
| −40° C., ft-lb/in. | 4.04 | 5.15 | 6.87 | 27.34 | 17.20 |

TABLE 4

Physical Properties of Unipol Polypropylene/Polyethylene Terephthalate Blends

|  | Unipol 5C14 Polymer | 75% Polypropylene 25% Copolyesterether | 50% Polypropylene 50% Copolyesterether | 25% Polypropylene 75% Copolyesterether | Copolyesterether 7352 |
|---|---|---|---|---|---|
| Tensile Strength, | | | | | |
| at Yield, psi | 5000 | 5120 | 5720 | — | 8070 |
| at Break, psi | 2080 | 4710 | 5430 | 6660 | 5000 |
| Tensile Elongation | | | | | |
| at Yield, % | 9 | 5 | 5 | — | 5 |
| at Break, % | 66 | 7 | 6 | 5 | 266 |
| Flexural | | | | | |
| Strength, psi | 5550 | 6790 | 8020 | 8980 | 11490 |
| Modulus, $10^5$ psi | 1.86 | 2.26 | 2.64 | 2.97 | 3.49 |
| Notched Izod | | | | | |
| 23° C., ft-lb/in. | .32 | .45 | .81 | .45 | .74 |
| 0° C., ft-lb/in. | .29 | .27 | .46 | .39 | .64 |
| −40° C., ft-lb/in. | .27 | .27 | .42 | .35 | .47 |
| Unnotched Izod | | | | | |
| 23° C., ft-lb/in. | 18.60 | .96 | .76 | .98 | 48.71 |
| 0° C., ft-lb/in. | 12.63 | 4.75 | 6.45 | 10.97 | 54.54 |
| −40° C., ft-lb/in. | 4.94 | 4.57 | 5.73 | 8.50 | 52.49 |

As used herein, the inherent viscosity (I.V.) is measured at 25° C. using 0.50 g of polymer per 100 mL of a solvent consisting of 60% by weight phenol and 40% by weight tetrachloroethane.

The tests used herein for determination of mechanical properties are described as follows:

| | |
|---|---|
| Melt Index | ASTM D1238 (Condition G) |
| Tensile Strength at Fracture | ASTM D638-80 |
| Elongation at Fracture | ASTM D638-80 |
| Flexural Modulus | ASTM D790-80 |
| Flexural Strength | ASTM D790-80 |
| Izod Impact | ASTM D256-81 |
| Heat Deflection Temperature (HDT), °C. | ASTM D648-72 |

Unless otherwise specified, all parts, percentages, ratios, etc., are by weight.

We claim:

1. A polymer blend having improved impact strength comprising
   I. about 20-95 wt % of a copolyesterether having an I.V. of about 0.8-1.5 dl/g and containing repeat units from
      A. a dicarboxylic acid component consisting essentially of 1,4-cyclohexanedicarboxylic acid having a trans isomer content of at least 70%,
      B. a glycol component consisting essentially of
         1. about 75-96 mol % 1,4-cyclohexanedimethanol,
         2. about 25-4 mol %, of poly(tetramethylene ether) glycol having a molecular weight of about 500 to 1100, and
      C. from 0 to about 1.5 mol %, based on the mole % of the acid or glycol component, of a branching agent having at least three functional groups consisting of COOH and/or OH and from 3 to 60 carbon atoms, and
   II. about 80-5 wt % of an isotactic homopolymer of propylene having a melt index of about 0.5 to about 100.

2. The blend of claim 1 containing about 40-70 wt % of said copolyesterether and about 60-30 wt % of said isotactic homopolymer of propylene.

3. The blend of claim 1 containing about 0.3-1.0 mol % of said branching agent.

4. A molded article of the composition of claim 1 having an unnotched Izod strength of greater than about 10 ft-lb/in. at 0° C.

5. A molded article of the composition of claim 2 having an unnotched Izod strength of greater than about 20 ft-lb/in. at 0° C.

6. A molded article of the composition of claim 3 having an unnotched Izod strength of greater than about 10 ft-lb/in. at 0° C.

* * * * *